Figure 1:
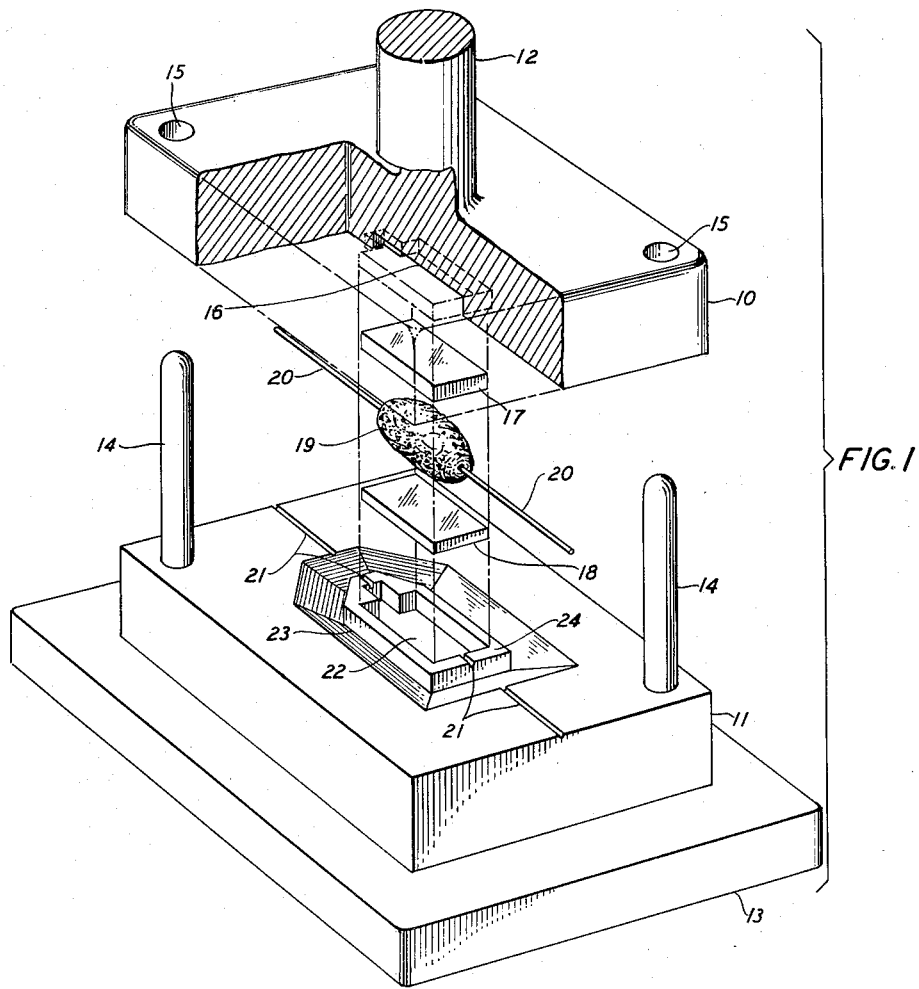

March 21, 1961    G. H. WILLIAMS, JR    2,975,487
MOLDING OF THERMOPLASTIC MATERIALS
Filed May 2, 1957

INVENTOR
G. H. WILLIAMS, JR.
BY
*George S. Bache*
ATTORNEY

United States Patent Office 2,975,487
Patented Mar. 21, 1961

2,975,487

MOLDING OF THERMOPLASTIC MATERIALS

George H. Williams, Jr., Cranford, N.J., assignor to Bell Telephone Laboratories, Incorporated, New York, N.Y., a corporation of New York Filed May 2, 1957, Ser. No. 656,705

1 Claim. (Cl. 18—59)

This invention relates to a process for molding thermoplastic materials at very low pressures, and more particularly a method of encapsulation of articles which cannot withstand application of high pressure or subjection to high temperatures.

There are three basic types of forming processes which can be utilized to embed an article in a plastic material: compression molding, injection molding and casting. Compression molding and injection molding are generally carried out by subjecting the plastic material and the article to be embedded therein to pressure upwards of 1500 pounds per square inch and temperatures in the range of 250° F. to 500° F. Depending upon the choice of plastic material and mold shape, the molding pressure could conceivably be of the order of 10,000 pounds per square inch. This use of high molding pressure is encountered also in transfer molding and cold molding which are analogs of compression and injection molding. None of these methods of molding is suitable for use in forming plastic wherein a delicate insert incapable of withstanding such severe pressures and temperatures is to be embedded. Recently an alkyd base resin compound has been developed which can be compression molded at pressures as low as 200 pounds per square inch. However, this development, although constituting a step in the right direction, leaves much to be desired in the way of a low pressure molding process adaptable to the encapsulation of delicate articles.

The third method listed above, casting, is well suited for embedding delicate items in plastic, and is widely used in the electronics industry for encapsulating and thereby protecting complete miniature circuits and resistor networks. However, the casting method is an expensive one and it is, therefore, not presently used to encapsulate low cost unit parts such as resistors or capacitors, but rather is used solely for high cost networks wherein the high cost of embedment can be more readily absorbed. The high cost of casting is due to the particular plastic materials which must be used, such as epoxy resins, which are high in cost when compared, for instance, with thermoplastic vinyls or cellulosics. Furthermore, the poured plastic and the embedded article must be cured at elevated temperatures for periods up to or greater than twelve hours, the exact cure time being dependent upon the temperature, mold shape and particular plastic material used.

From the foregoing, it is apparent that there exists a need for a low cost, low pressure, low temperature molding process which may be utilized to encapsulate delicate items which cannot withstand high pressures and temperatures. The present method of encapsulation fills this void in the molding field. Accordingly, a broad object of the present invention is to provide a method of encapsulation which may be practiced at low pressures and low temperatures.

A more specific object is to provide a method of encasing a delicate article in a thermoplastic material which has flexibility and which will give protection to the encased article against impact and consequent damage.

Another specific object is to provide by proper choice of mold shape an encasement of a delicate electrical component which has a size, configuration, and appearance which would be acceptable to the modular designs of printed and other circuitry.

A still more specific object of the present invention is to provide a method of encapsulating solid-electrolyte capacitors of the kind described in application Serial No. 346,416, filed April 2, 1953, in the names of H. E. Haring and R. L. Taylor. A capacitor of this type is particularly fragile because of its sponge-like make-up and, therefore, advantageously should not be subjected to excessive pressure during the process of encapsulation. Furthermore, consideration of the melting point of the solder used to attach the leads to this capacitor thereby fixes the upper limit of temperature to which the capacitor may be subjected. By the practice of the present invention the capacitor may be encapsulated without exceeding the maximum allowable pressure or temperature.

In developing this method of encapsulation, advantage has been taken of the fact that there exists for all thermoplastic materials a temperature, or more properly, a range of temperatures, at which two sheets of the same thermoplastic material will fuse under application of slight pressure, and at which temperature the resultant fused material will be sufficiently rigid to retain its shape. Since the thermoplastic material may be thought of as possessing many of the properties of a gel at such temperature, for the purposes of this invention such temperature will be referred to hereinafter as the gel temperature. The gel temperature may be defined as the lowest temperature at which two pieces of plastic if pressed together with an applied pressure of five pounds per square inch will require a force substantially equal to the tensile strength of the plastic at that temperature to pull apart the assembled pieces. In general, the bond formed between two pieces of plastic pressed together at the gel temperature is as strong as the material itself at any temperature below the gel temperature.

In accordance with the present invention, the article to be encapsulated is placed upon one piece of sheet thermoplastic in the bottom block of a two-piece flash mold which is maintained at the gel temperature, a second piece of the same thermoplastic material in sheet form is then placed on top of the article so as to form a sandwich, the upper block is then caused to descend contacting the second piece of thermoplastic, and the encasement completed under conditions such that the thermoplastic material has attained the gel temperature. It is to be noted, in contradistinction to compression molding as practiced heretofore, that there is no need in the present process for cooling the encapsulation prior to removal from the mold. In a preferred embodiment, the pieces of plastic are preheated to a temperature below the gel temperature prior to placing in the mold.

Figure 2:
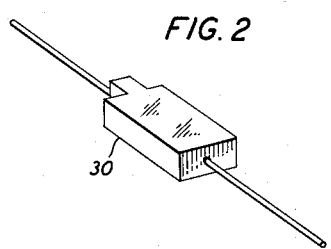

The invention will be better understood and appreciated from the following more detailed description taken in conjunction with the accompanying drawings in which:

Fig. 1 is an exploded perspective view partly in section of a flash mold as utilized to encapsulate a tantalum solid-electrolyte capacitor; and Fig. 2 is a perspective view of an encased tantalum capacitor.

Referring now to the drawings, Fig. 1 shows the mold utilized to produce the encased tantalum capacitor shown in Fig. 2. In particular, Fig. 1 provides a perspective view of the upper mold 10, partly in section, and lower mold block 11 both of which are heated and maintained at substantially the gel temperature of the thermoplastic material by any means known to workers in the art, such means not being shown. The capacitor 19 which is to be encased is shown between the top piece of plastic 17 and the bottom piece 18, such being the spatial relationship prior to the closing of the mold. In the lower mold block 11 can be seen the cavity 22, the flash surface 24, and the flash reservoir 23. Grooves 21, also in lower mold block 11, are provided to hold the lead wires 20 of the capacitor 19 to be encased. In the upper mold block 10 there is shown the cavity 16, which has the same cross-sectional configuration as the cavity 22 in the lower mold block 11. However, the relationship between the configuration of the cavities is dependent on the desired shape of the finished encasement and does not constitute a limitation inherent in the present method. Characteristically, the depth of cavity 22 is approximately twice the depth of cavity 16, and this coupled with the presence in the lower mold block 11 of grooves 21, flash surface 24, and reservoir 23 increases the area of contact between the mass of plastic and the lower mold block thereby causing the completed encasement to remain in the lower block when the mold is opened. The guide pins 14 in lower mold block 11 and the corresponding holes 15 therefor in the upper mold block 10 serve to insure proper alignment between the mold blocks. The flash mold is advantageously operated by means of an air press, and the bedplate 13 to which the lower mold block 11 is attached and the piston 12 to which the top mold block 10 is connected represent these parts of an air press which is itself not shown. In the particular embodiment to which the drawings relate, an air press having a closing time of three seconds at 45 pounds per square inch was used. It is characteristic of the process that the pressure source is capable of causing the mold to close at a rate independent of the opposing force.

Although the particular flash mold depicted in the drawing was designed specifically to make encasements for tantalum capacitors, it should be appreciated that the features embodied therein are of such nature that they may be incorporated in the design of a mold for encapsulating by the present process any object without restriction as to size or shape other than the usual limitations encountered in the fabrication of such molds. In general, the design of the flash mold to be used for any particular encapsulation should follow the accepted practice in the art.

Although the process may be practiced utilizing any thermoplastic material to encapsulate an endless variety of articles, the particular embodiment discussed hereinbelow relates to the encasement of a tantalum solid-electrolyte capacitor in a plastic formulation consisting of 65 percent cellulose acetate butyrate and 35 percent of plasticizer dioctyl phthalate, by weight. The choice of the particular butyrate formulation to encapsulate the capacitor was predicated on the fact that its gel temperature, approximately 255° F., is compatible with the temperature limitations imposed by the properties of the capacitor to be encased.

In this embodiment the bottom piece of plastic 18 was cut from a sheet of 60 mils thickness since this thickness allowed the leads 20 of the capacitor 19 to rest in the grooves 21 supplied therefor when the capacitor was placed in the mold. The thickness of the upper piece 17, 90 mils, resulted from a consideration of the total quantity of plastic necessary to form the encasement. The factors influencing the determination of the total quantity of plastic required for use in flash molding processes are well known to workers skilled in the art. The two pieces of butyrate plastic 17 and 18 were then shaped as shown in Fig. 1 to fit into cavity 22. In this particular embodiment the pieces of plastic 17 and 18 were made the same shape because the cavity 22 and cavity 16 were identical in cross-sectional configuration. It is advantageous to shape the second piece of plastic, that corresponding to piece 17 in this embodiment, to fit the upper cavity as this will allow for better contact between the plastic and the upper mold block thus allowing for a higher rate of heat transfer. Such a high rate of heat transfer is desirable as will be pointed out hereinbelow.

Following the shaping step, the pieces 17 and 18 were then preheated to a temperature of approximately 230° F., which is approximately 25° F. lower than the gel temperature. Conveniently, the plastic may be preheated to a temperature which is between 5° F. to 50° F. lower than the gel temperature, and preferably to a temperature which is between 10° F. to 40° F. lower than the gel temperature. The two pieces of plastic need not be preheated to the same temperature. The mold blocks 10 and 11 were heated and maintained at the gel temperature of 255° F. by means of cartridge type heaters controlled by relays and thermoswitches.

The 60-mil piece 18 was placed on the bottom of cavity 22, the tantalum capacitor 19 placed on top of the 60-mil piece with the leads 20 placed in grooves 21, and the 90-mil piece 17 placed on top of the capacitor thus forming a sandwich. Air pressure was then applied to the air press causing the top mold block 10 to descend. As the top mold block 10 descended and contacted piece of plastic 17, the excess plastic flowed over flash surface 24 of lower mold block 11 into the flash reservoir 23. When the mold was completely closed, the face of the top mold block 10 contacted the plastic on flash surface 24 and the full force tending to close the mold was exerted on this flash surface, insuring the production of a thin flash. The air pressure was then released, the mold opened and flash removed, and the finished encasement was removed from the lower mold block.

There is a very important reason for specifying a closing time for the mold which is independent of the opposing force. In the process of this invention, as the top mold block descends and contacts the top piece of thermoplastic, the contacted surface of the top piece is heated almost instantaneously to its gel temperature. As the top mold block continues to descend, the thermoplastic begins to flow. The pressure sustained by the thermoplastic will correspond to the rate at which it is being caused to flow by the descent of the top mold block. Thus by judicious choice of the closing time of the mold the pressure on the plastic and therefore the pressure on the article to be encapsulated may be controlled and held below the maximum allowable.

It is of course a characteristic of this process that the pieces of thermoplastic are at the gel temperature when being molded. The bottom piece of thermoplastic is heated to the gel temperature by contact with the lower mold block, and the top piece is heated to the gel temperature by contact with the top mold block and possibly by conduction through the article to be encapsulated. Therefore where thick pieces of thermoplastic are used to form the encasement, the closing time of the mold must be chosen carefully to insure that the plastic is at its gel temperature when being molded. If the closing time is too fast, the plastic will not have sufficient time to reach the gel temperature and therefore a much larger pressure will be required to effect a given flow rate. It is therefore essential to the practice of this process that a closing time be chosen which allows for the plastic to be at the gel temperature when being molded. In this respect it may be seen that by shaping the second piece of plastic to fit the upper cavity, the resulting high rate of heat transfer thus allows for use of a faster closing time.

In the embodiment described hereinabove, consideration of the thickness of the plastic sheets, the temperature to which they were preheated, and the composition dictated the use of an air press having a three-second closing time at forty-five pounds pressure.

The present process has been described hereinabove as including the step of preheating the plastic prior to molding. It is to be understood that such a preheating step is included merely as an expedient in reducing molding time in order to make the process commercially feasible. The process may be practiced to equal advantage if the preheating step is omitted. In such case, the plastic would be heated to the molding temperature from room temperature by contact with the flash mold. It is to be recognized that the closing time of the mold will necessarily be increased by omission of the preheating step.

The choice of a thermoplastic for a particular application may be influenced by factors such as the hardness or softness, opacity or translucence, or the chemical properties desired in the finished encapsulation. In this respect, formulations involving the use of various plasticizers whose effect on the properties of thermoplastic materials is well known to a worker skilled in the art will be helpful to achieve certain desirable properties. However, it should appreciated that incorporation of a plasticizer will affect the gel temperature. Thus, in the case of the cellulose acetate butyrate, the table below illustrates this effect:

| Percent Dioctyl Phthalate Plasticizer in Cellulose Acetate Butyrate (By Weight) | Gel Temperature, ° F. |
|---|---|
| 35 | 255 |
| 25 | 284 |
| 22 | 293 |
| 15 | 311 |

Moreover, a factor to be considered in the choice of a thermoplastic for a particular encapsulation is the maximum temperature to which the article to be encapsulated can be subjected. The plastic chosen to form the encasement must have a gel temperature below such upper limit. In the encapsulation of a tantalum solid-electrolyte capacitor, for instance, an upper limit of 300° F. was imposed on the gel temperature since the solder used in connecting the wire leads to the body of the capacitor melts at approximately 350° F. Conveniently any thermoplastic material whose gel temperature is below 350° F. can be used. In this respect, pure polystyrene whose gel temperature is 300° F., pure polyethylene of gel temperature 265° F., or a formulation of cellulose acetate containing 30 percent by weight of plasticizer dimethyl phthalate of gel temperature 230° F. are among the variety of plastics and plastic formulations which can be used for this particular encapsulation.

In general, this invention can be practiced successfully utilizing any one of the members of the group of thermoplastics known as the cellulosics. This group in addition to cellulose acetate butyrate comprises materials such as cellulose acetate, ethyl cellulose, and cellulose propionate. Furthermore, formulations containing from 5 percent to 50 percent of plasticizer may be used. Any known plasticizers, in addition to those mentioned above, such as tricresyl phosphate, dibutyl phthalate, and triethylene glycol dicaprilate may be used. The lower limit of percent plasticizer is set by the fact that below this percentage, the formulation tends to be brittle. The upper limit is set by the fact that incorporation of larger amounts of plasticizer would result in a formulation too soft for use as an encasing material. In fact, the present process may be practiced utilizing any thermoplastic material to encapsulate any article so long as the particular choices are consonant with the limitations and restrictions recited hereinabove. Moreover, it is to be understood that the specific embodiment described herein is merely illustrative of the general principle of the invention.

For purposes of convenience the present method has been described specifically in terms of the gel temperature. It is appreciated by a worker skilled in the art that the encapsulation process described retains many of the advantages adverted to herein if the encapsulation is practiced within a narrow range of temperatures bracketing the gel temperature. In particular the present process can be practiced by molding in the range of from 10° F. below to 10° F. above the gel temperature. These conditions of temperature are determined by the temperature at which the flash mold is maintained. The lower limit cannot be exceeded because the bond formed between the pieces of plastic becomes significantly weakened. The basis for the upper limit is the fact that above this temperature the plastic will be too soft to retain its shape and it will be difficult to remove the encapsulation from the mold. An advantage, however, of using a mold temperature higher than the gel temperature is that the molding time can be reduced.

What is claimed is:

The process of encapsulating a tantalum solid-electrolytic capacitor in a thermoplastic material consisting of 65% cellulose acetate butyrate and 35% dioctyl phthalate by weight comprising the steps of preheating a first sheet of said thermoplastic material having a thickness of approximately 60 mils to a temperature of approximately 230° F., preheating a second sheet of said thermoplastic material having a thickness of approximately 90 mils to a temperature of approximately 230° F., placing said first sheet of said thermoplastic material in the cavity of the bottom block of a two piece flash mold, said flash mold being maintained at a temperature of from 220° F. to 240° F., placing said capacitor upon said first sheet, placing said second sheet upon said capacitor to form a sandwich therewith, causing said sheets of thermoplastic material to flow by closing said flash mold for a period approximating three seconds, said mold being closed with a pressure not exceeding 45 p.s.i., opening said mold, and removing the encased article from said mold.

References Cited in the file of this patent

UNITED STATES PATENTS

| 1,873,548 | Cole | Aug. 23, 1932 |
| 2,176,604 | Benkelman | Oct. 17, 1939 |
| 2,358,259 | Siedschlag et al. | Sept. 12, 1944 |
| 2,379,793 | Eenigenburg | July 3, 1945 |
| 2,704,880 | Brennan | Mar. 29, 1955 |